United States Patent
Choi et al.

(10) Patent No.: US 10,474,929 B2
(45) Date of Patent: Nov. 12, 2019

(54) CYCLIC GENERATIVE ADVERSARIAL NETWORK FOR UNSUPERVISED CROSS-DOMAIN IMAGE GENERATION

(71) Applicant: NEC Laboratories America, Inc., Princeton, NJ (US)

(72) Inventors: Wongun Choi, Lexington, MA (US); Samuel Schulter, Santa Clara, CA (US); Kihyuk Sohn, Fremont, CA (US); Manmohan Chandraker, Santa Clara, CA (US)

(73) Assignee: NEC Corporation (JP)

( * ) Notice: Subject to any disclaimer, the term of this patent is extended or adjusted under 35 U.S.C. 154(b) by 121 days.

(21) Appl. No.: 15/906,710

(22) Filed: Feb. 27, 2018

(65) Prior Publication Data
US 2018/0307947 A1    Oct. 25, 2018

Related U.S. Application Data

(60) Provisional application No. 62/489,529, filed on Apr. 25, 2017.

(51) Int. Cl.
*G06K 9/62* (2006.01)
*G06K 9/03* (2006.01)
(Continued)

(52) U.S. Cl.
CPC ............ *G06K 9/6259* (2013.01); *G06K 9/03* (2013.01); *G06K 9/6201* (2013.01); *G06K 9/66* (2013.01);
(Continued)

(58) Field of Classification Search
CPC .......... G06K 9/6259; G06K 9/03; G06K 9/66; G06K 9/6201; G06T 11/001; G06T 11/60; G06N 3/0454; G06N 3/0472; G06N 3/08
See application file for complete search history.

(56) References Cited

U.S. PATENT DOCUMENTS

| 7,814,040 B1 * | 10/2010 | Zhang | G06K 9/6278 706/45 |
| 9,311,713 B2 * | 4/2016 | Han | G06K 9/6259 |

(Continued)

OTHER PUBLICATIONS

Taeksoo Kim et al., "Learning to Discover Cross-Domain Relations with Generative Adversarial Networks", May 15, 2017, arXiv, total 10 pages. (Year: 2017).*

(Continued)

*Primary Examiner* — Brenda C Bernardi
(74) *Attorney, Agent, or Firm* — Joseph Kolodka

(57) ABSTRACT

A system is provided for unsupervised cross-domain image generation relative to a first and second image domain that each include real images. A first generator generates synthetic images similar to real images in the second domain while including a semantic content of real images in the first domain. A second generator generates synthetic images similar to real images in the first domain while including a semantic content of real images in the second domain. A first discriminator discriminates real images in the first domain against synthetic images generated by the second generator. A second discriminator discriminates real images in the second domain against synthetic images generated by the first generator. The discriminators and generators are deep neural networks and respectively form a generative network and a discriminative network in a cyclic GAN framework configured to increase an error rate of the discriminative network to improve synthetic image quality.

20 Claims, 5 Drawing Sheets

(51) Int. Cl.
   *G06K 9/66* (2006.01)
   *G06T 11/60* (2006.01)
   *G06N 3/04* (2006.01)
   *G06N 3/08* (2006.01)
   *G06T 11/00* (2006.01)

(52) U.S. Cl.
   CPC ......... *G06N 3/0454* (2013.01); *G06N 3/0472* (2013.01); *G06N 3/08* (2013.01); *G06T 11/001* (2013.01); *G06T 11/60* (2013.01)

(56) References Cited

U.S. PATENT DOCUMENTS

| | | | | |
|---|---|---|---|---|
| 2016/0070969 A1* | 3/2016 | Kavanau | ............ | G06K 9/00134 382/285 |
| 2016/0070986 A1* | 3/2016 | Chidlovskii | ....... | G06K 9/00785 382/104 |
| 2016/0155020 A1* | 6/2016 | Tariq | .................. | G06K 9/00771 382/105 |
| 2018/0247201 A1* | 8/2018 | Liu | ........................... | G06T 1/00 |

OTHER PUBLICATIONS

Ian J. Goodfellow et al., "Generative Adversarial Nets", Jun. 10, 2014, arXiv, total 9 pages. (Year: 2014).*
International Search Report, corresponding PCT/US2018/020101, dated Feb. 28, 2018, total 3 pages. (Year: 2018).*
Written Opinion of the International Searching Authority, corresponding PCT/US2018/020101, dated Jun. 14, 2018, total 4 pages. (Year: 2018).*
Radford et al., "Unsupervised Representation Learning With Ceep Convolutional Generative Adversarial Networks", arXiv, Jan. 2016, pp. 1-16.
Isola et al., "Image-to-image Translation With Conditional Adversarial Networks", arXiv, Nov. 2017, pp. 1-17.
Johnson et al., Perceptual Losses for Real-Time Style Transfer and Super-Resolution, arXiv, Mar. 2016, pp. 1-18.
Taigman et al., "Unsupservised Cross-Domain Image Generation", arxiv, Nov. 2016, pp. 1-14.

* cited by examiner

CYCLIC GENERATIVE ADVERSARIAL NETWORK FOR UNSUPERVISED CROSS-DOMAIN IMAGE GENERATION

RELATED APPLICATION INFORMATION

This application claims priority to provisional application Ser. No. 62/489,529 filed on Apr. 25, 2017, incorporated herein by reference.

BACKGROUND

Technical Field

The present invention relates to image recognition, and more particularly to a cyclic generative adversarial network for unsupervised cross-domain image generation.

Description of the Related Art

Generating images in target domains while having labels only in the source domain allows learning image recognition classifiers in the target domain without need for target domain labels. In fields that can involve image generation, the test (target) and source (training) domains for the image generator can often vary in a multitude of ways. As such, the quality of the images generated by the image generator may be lacking and paired training data of corresponding images from the two domains may not be available. Accordingly, there is a need for domain adaptation in order to reduce such variations and provide enhanced classification accuracy.

SUMMARY

According to an aspect of the present invention, a system is provided for unsupervised cross-domain image generation relative to a first image domain and a second image domain that each include real images. The system includes a first image generator for generating synthetic images having a similar appearance to one or more of the real images in the second image domain while including a semantic content of one or more of the real images in the first image domain. The system further includes a second image generator for generating synthetic images having a similar appearance to at least one of the real images in the first image domain while including a semantic content of at least one of the real images in the second image domain. The system also includes a first discriminator for discriminating the real images in the first image domain against the synthetic images generated by the second image generator. The system additionally includes a second discriminator for discriminating the real images in the second image domain against the synthetic images generated by the first image generator. The discriminators and the generators are deep neural networks and respectively form a generative network and a discriminative network in a cyclic Generative Adversarial Network (GAN) framework that is configured to increase an error rate of the discriminative network to improve a quality of the synthetic images.

According to another aspect of the present invention, a computer-implemented method is provided for unsupervised cross-domain image generation relative to a first image domain and a second image domain that each include real images. The method includes generating, by a first image generator, synthetic images having a similar appearance to one or more of the real images in the second image domain while including a semantic content of one or more of the real images in the first image domain. The method further includes generating, by a second image generator, synthetic images having a similar appearance to at least one of the real images in the first image domain while including a semantic content of at least one of the real images in the second image domain. The method also includes discriminating, by a first discriminator, the real images in the first image domain against the synthetic images generated by the second image generator. The method additionally includes discriminating, by a second discriminator, the real images in the second image domain against the synthetic images generated by the first image generator. The generators are each neural network based and respectively form a generative network and a discriminative network in a cyclic Generative Adversarial Network (GAN) framework. The method further includes increasing an error rate of the discriminative network to improve a quality of the synthetic images.

According to yet another aspect of the present invention, a computer program product is provided for unsupervised cross-domain image generation relative to a first image domain and a second image domain that each include real images. The computer program product includes a non-transitory computer readable storage medium having program instructions embodied therewith. The program instructions are executable by a computer to cause the computer to perform a method. The method includes generating, by a first image generator of the computer, synthetic images having a similar appearance to one or more of the real images in the second image domain while including a semantic content of one or more of the real images in the first image domain. The method further includes generating, by a second image generator of the computer, synthetic images having a similar appearance to at least one of the real images in the first image domain while including a semantic content of at least one of the real images in the second image domain. The method also includes discriminating, by a first discriminator of the computer, the real images in the first image domain against the synthetic images generated by the second image generator. The method additionally includes discriminating, by a second discriminator of the computer, the real images in the second image domain against the synthetic images generated by the first image generator. The discriminators and the generators are each neural network based and respectively form a generative network and a discriminative network in a cyclic Generative Adversarial Network (GAN) framework. The method further includes increasing an error rate of the discriminative network to improve a quality of the synthetic images.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to a cyclic generative adversarial network for unsupervised cross-domain image generation.

In an embodiment, a cyclic generative adversarial network is proposed that takes images from a source domain to generate images in a different target domain and then back to the source domain, without having any corresponding pairs of images in the source and target domains. This is used for image recognition applications such as object detection and semantic segmentation, with labels available in the source domain, but no labels in the target domain, whereby the generated images become available as training data with labels preserved across the source and target domains while the image properties change.

In an embodiment, the present invention provides an image generation algorithm that can transfer an image in one domain to another domain. For example, the domain transfer can involve, but is not limited to, for example, generating realistic images from synthetic images, generating night images from day images, and so forth. In an embodiment, the generation process keeps the high level semantic concepts in the input image while transforming the image characteristics to make it indistinguishable from the images in the target domain.

In an embodiment, an unsupervised domain-to-domain translation model is provided that could be learned without any supervision in the training dataset. This enables us to learn a high quality image generation model for many valuable applications, such as real image generation from synthetic images, rainy scene generation from bright day images, and so forth, where it is not possible to have corresponding images in both domains (that is, supervised as in image-to-image translation).

In an embodiment, the present invention employs a cyclic Generative Adversarial Network (GAN) framework that enforces recovering the entire image content when applied to two domain transfers cyclically such as, for example, but not limited to, rainy image to bright image and back to a rainy image. Enforcing such cyclic consistency aids in domain transfer model learning which keeps the semantic contents consistent across the generation process while adapting image properties to the target domain.

Figure 1:
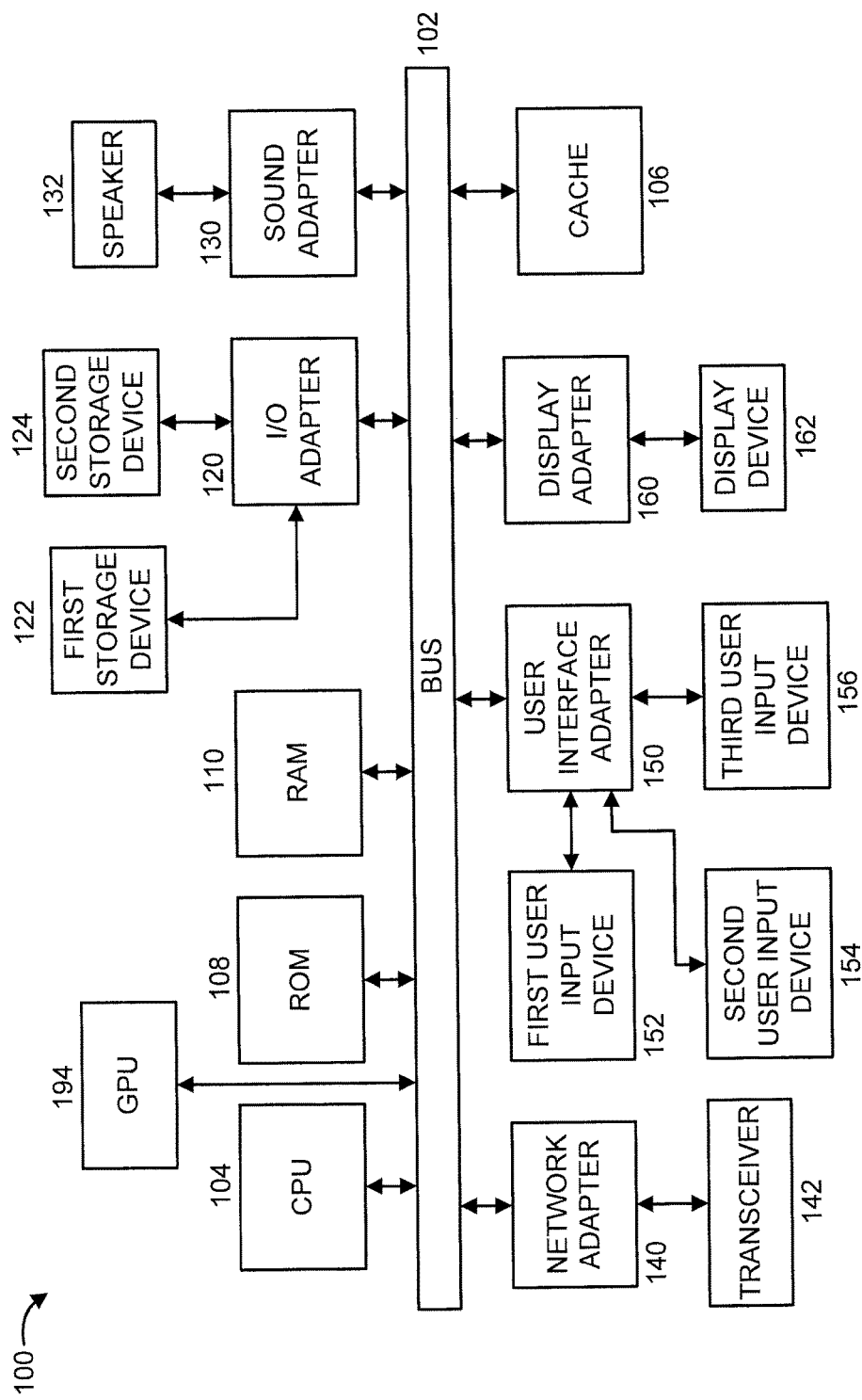
FIG. 1 shows an exemplary processing system to which the present principles may be applied, according to an embodiment of the present principles.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
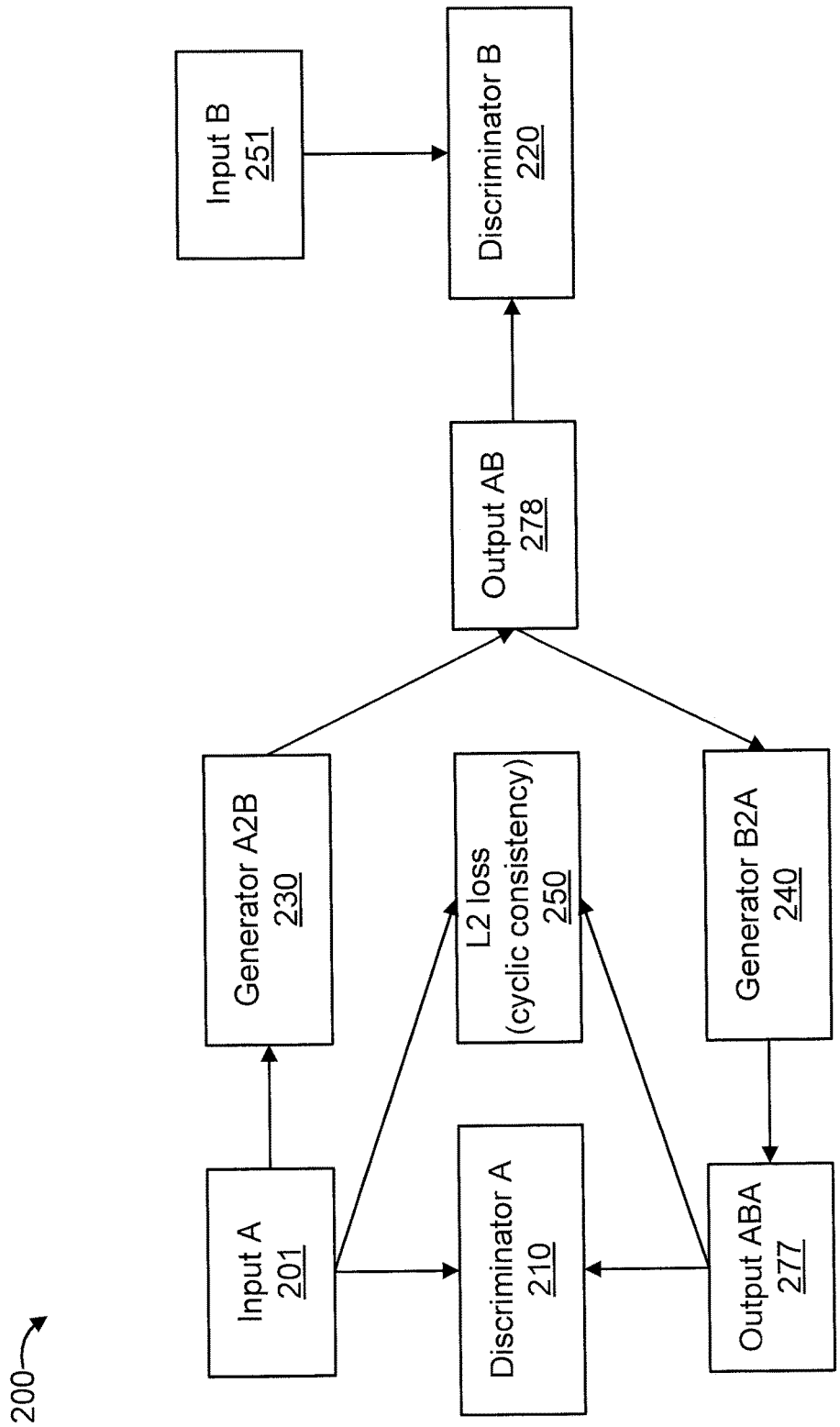
FIG. 2 shows an exemplary cyclic Generative Adversarial Network (GAN) framework of the present invention, in accordance with an embodiment of the present invention.

Moreover, it is to be appreciated that framework 200 described below with respect to FIG. 2 is a framework for implementing respective embodiments of the present invention. Part or all of processing system 100 may be implemented in one or more of the elements of framework 200.

Figure 4:
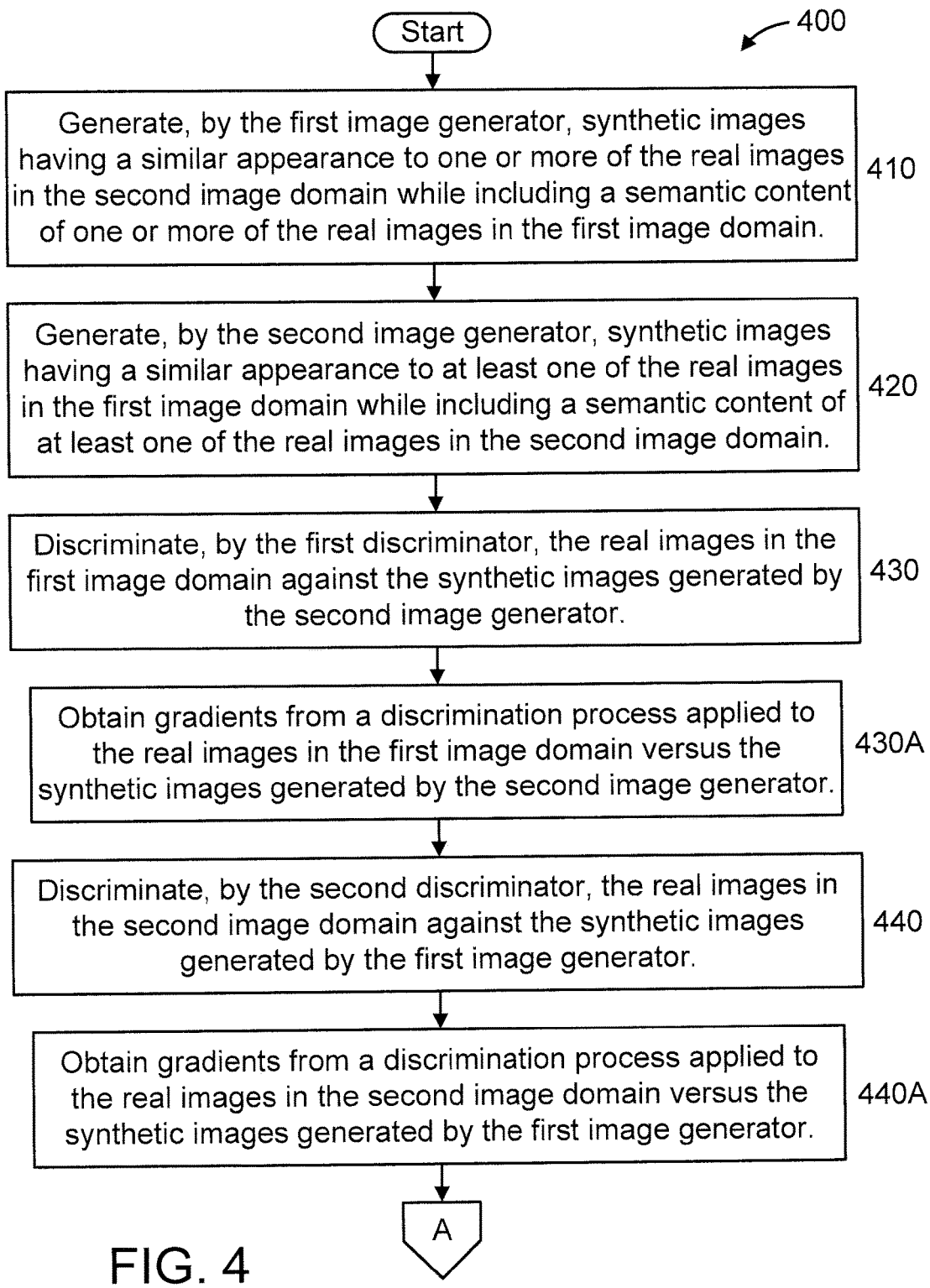
FIGS. 4-5 show an exemplary method for unsupervised cross-domain image generation relative to a first image domain and a second image domain, in accordance with an embodiment of the present principles.
Figure 5:
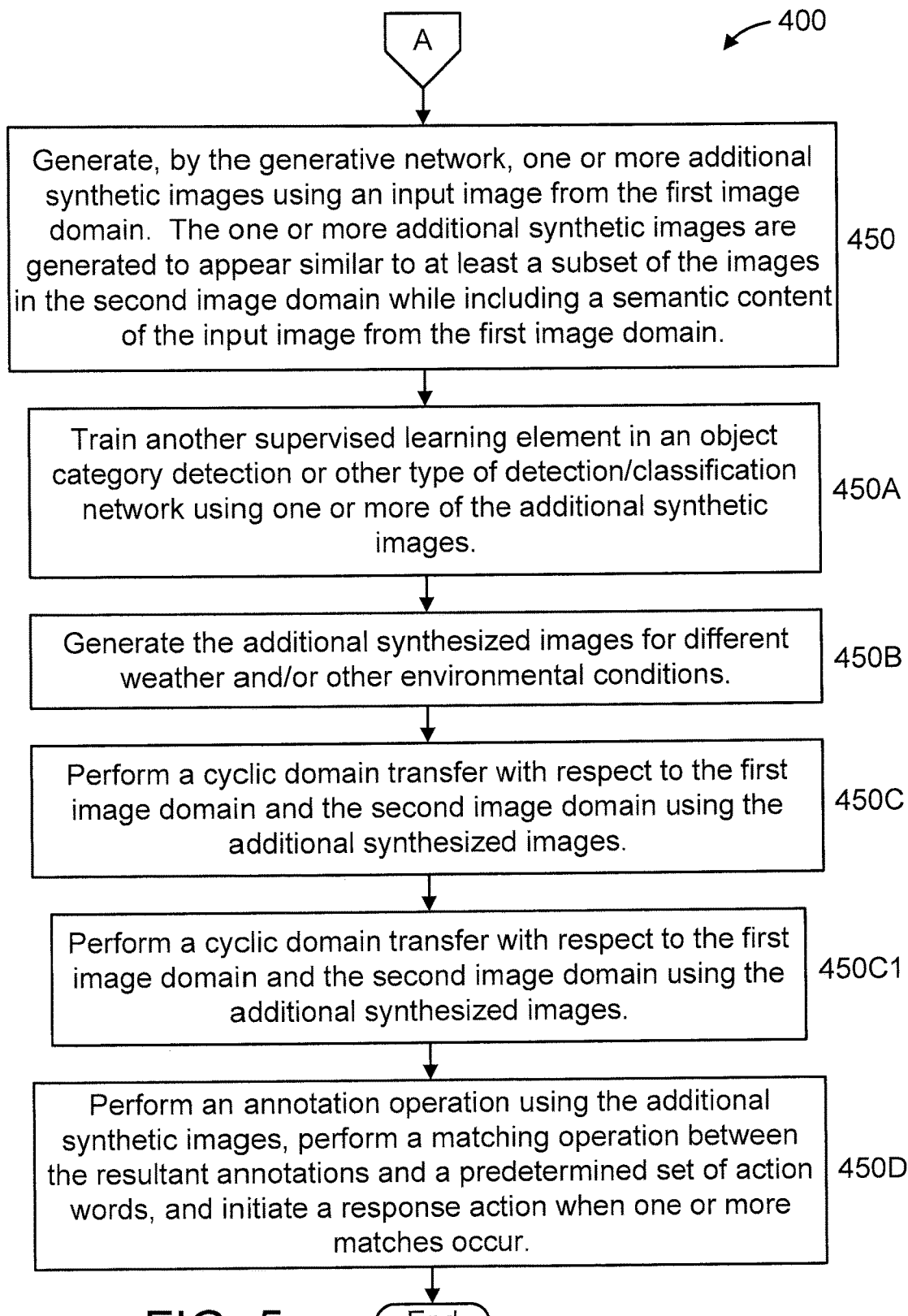

Further, it is to be appreciated that processing system 100 may perform at least part of the method described herein including, for example, at least part of method 400 of FIGS. 4-5. Similarly, part or all of framework 200 may be used to perform at least part of method 400 of FIGS. 4-5.

FIG. 2 shows an exemplary cyclic Generative Adversarial Network (GAN) framework 200 of the present invention, in accordance with an embodiment of the present invention.

The cyclic GAN framework (hereinafter "framework" in short) 200 includes a first domain input (hereinafter "input A" in short) 201 and a second domain input (hereinafter "input B" in short) 251 corresponding to a first image domain (hereinafter "domain A" in short) 291 and a second image domain (hereinafter "domain B" in short) 292, respectively. Domain A 291 and domain B 292 are respective image domains that include real images. Hence, input A 201 and input B 251 are implemented as respective real images. Thus, the two domains are not required to be supervised (include the same images).

The framework 200 further includes a neural network based discriminator (hereinafter "discriminator A" in short) 210, a neural network based discriminator (hereinafter "discriminator B" in short) 220, a neural network based image generator (hereinafter "generator A2B" in short) 230, a neural network based image generator (hereinafter "generator B2A" in short) 240, and a cyclic consistency loss (also referred to herein as "L2 loss") 250. The generator A2B 230 can be implemented as a generative model that is trained with domain A 291. In an embodiment, the generators can be implemented by convolutional neural networks, while the discriminators can be implemented by de-convolutional neural networks. Of course, other types of neural networks can also be used in accordance with the teachings of the present invention, while maintaining the spirit of the present invention.

The generator A2B 230 generates images ABA 277 that are looks similar to the images in domain B 292 but including the semantic contents of the input image from domain A 291. The generator B2A 240 generates images AB 278 based on the output of the generator A2B 230. The discriminator A 210 and discriminator B 220 are trained to discriminate real image from domain A 291 (or domain B 292) against the generated images for domain A 291 (or domain B 292). That is, the discriminator A 210 discriminates a real image from the domain A 291 against a generated image for the domain A 291, while the discriminator B 220 discriminates a real image from domain B 292 against a generated image for domain B 292.

The Generative Adversarial Network (GAN) framework 200, together with cyclic consistency loss L2 250, learn the neural network based elements (210, 220, 230, and 240). The GAN loss encourages the generated outputs to look similar to the images in the corresponding target domain, which is achieved by the gradient coming from the discriminators. On the other hand, the cyclic consistency loss (L2 in our case) helps keep the semantic contents of the image. Note that we also learn the image cyclic GAN for the BAB directions (that is, from B to A and back to B) simultaneously. The GAN loss encourages images synthesized by the generator to have similar statistics as images from the target domain, which is achieved by gradients from the discriminator. The L2 loss results from the cyclic approach used for the GAN framework and represents the cyclic consistency loss in the cross-domain image generation. It compares the original image with the image synthesized using the output of the first generator as input. While an L2 loss is used in this embodiment, equivalent formulation may be derived using alternative losses such as L1, SSIM, perceptual loss, or other objectives that impose consistency for certain image statistics such as edge distributions.

In an embodiment the GAN framework 200 is configured to learn both the generative model and the discriminator at the same using the combination of GAN and L2 loss functions. The resulting training dynamics are usually described as a game between a generator(s) (i.e., the generative model(s)) and a discriminator(s) (i.e., the loss function(s)).

The discriminators (210 and 220) and the generators (230 and 240) respectively form a generative network and a discriminative network in the Generative Adversarial Network (GAN) framework 200, where the GAN framework is configured to increase an error rate of the discriminative network (i.e., "fool" the discriminator network by producing novel synthetic images that appear to have come from the true data distribution). That is, the goal of the generators (230 and 240) is to produce realistic samples that fool the discriminators (210 and 220), while the discriminators (210 and 220) are trained to distinguish between the true training data and samples from the generators (230 and 240).

In an embodiment, the framework 200 can be based on deep learning and is trainable, rather than relying on a handcrafted generation algorithm. Thus, it can be applied to many different domain transfer tasks as long as there exists suitable datasets. Also, since the present invention does not require any supervision, it is widely applicable to many different image generation tasks.

Figure 3:
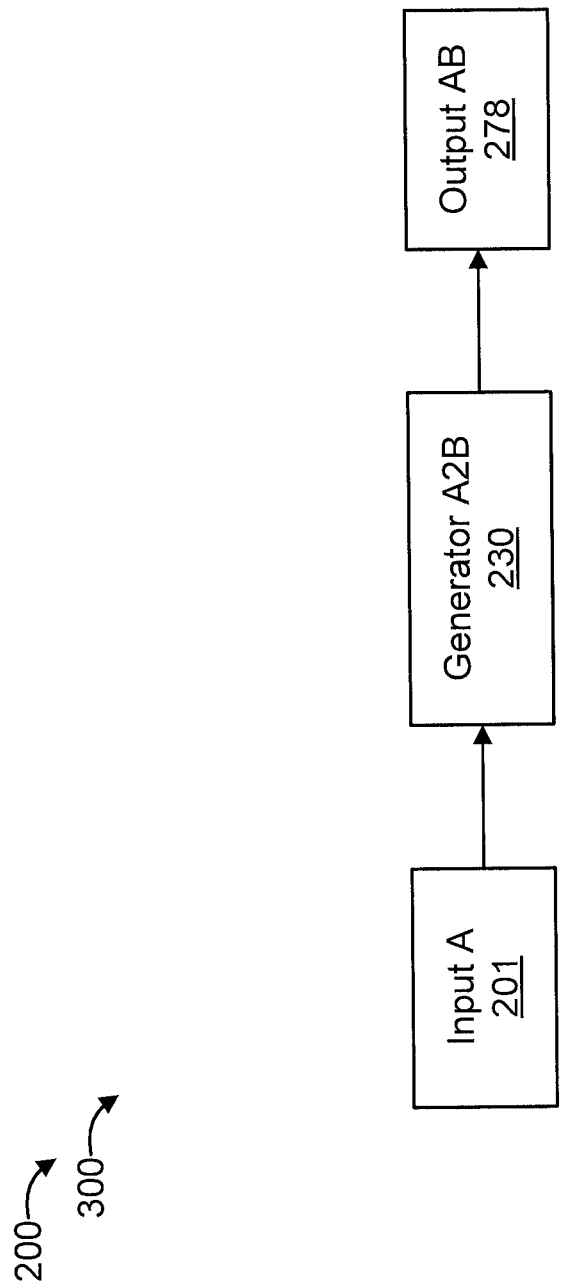
FIG. 3 shows a portion of the cyclic GAN framework of FIG. 2 during a testing phase, in accordance with an embodiment of the present invention.

FIG. 3 shows a portion of the cyclic GAN framework 200 of FIG. 2 during a testing phase 300, in accordance with an embodiment of the present invention.

Once the generator A2B 230 is trained with domain A 291, the generator A2B 230 can be deployed to produce images in domain B 292 with any images from domain A 291.

FIGS. 4-5 show an exemplary method 400 for unsupervised cross-domain image generation relative to a first image domain and a second image domain that each include real images, in accordance with an embodiment of the present principles.

The method 400 is performed by a cyclic Generative Adversarial Network (GAN) having a first image generator (e.g., generator A2B 230), a second image generator (e.g., generator B2A 240), a first discriminator (e.g., discriminator A 210), and a second discriminator (e.g., discriminator B 220). The discriminators and the generators are each neural network based and respectively form a generative network and a discriminative network in the cyclic Generative Adversarial Network (GAN) framework. The cyclic GAN framework is configured to increase an error rate of the discriminative network to improve a quality of the synthetic images. In an embodiment, blocks 410-440 can correspond to a training phase of the cyclic GAN framework, and blocks 450 and 460 can correspond to a test phase of the cyclic GAN framework.

At block 410, generate, by the first image generator, synthetic images having a similar appearance to one or more of the real images in the second image domain while including a semantic content of one or more of the real images in the first image domain.

At block 420, generate, by the second image generator, synthetic images having a similar appearance to at least one of the real images in the first image domain while including a semantic content of at least one of the real images in the second image domain.

At block 430, discriminate, by the first discriminator, the real images in the first image domain against the synthetic images generated by the second image generator.

In an embodiment, block 430 can include block 430.

At block 430A, obtain gradients from a discrimination process applied to the real images in the first image domain versus the synthetic images generated by the second image generator.

At block 440, discriminate, by the second discriminator, the real images in the second image domain against the synthetic images generated by the first image generator.

In an embodiment, block 440 can include block 440.

At block 440A, obtain gradients from a discrimination process applied to the real images in the second image domain versus the synthetic images generated by the first image generator.

At block 450, generate, by the generative network (now trained per blocks 410-440), one or more additional synthetic images using an input image from the first image domain. The one or more additional synthetic images are generated to appear similar to at least a subset of the images in the second image domain while including a semantic content of the input image from the first image domain. The additional synthetic images will be of a higher quality than the previously generated synthetic images due the learning process implemented by the training of the cyclic GAN framework. For example, the additional synthetic images can use the obtained gradients from blocks 430A and 440A in order to exploit the GAN loss to obtain similar appear, while a cyclic consistency loss (L2) is exploited to preserve semantic content from a source domain.

The additional synthetic images can be used for a myriad of applications, as readily appreciated by one ordinary skill in the art. For example, other applications to which the present invention can be applied include, but are not limited to, training other supervised learning elements in an object category detection or other type of detection/classification network (see, e.g., block 450A), the generation of datasets for different weather conditions (see, e.g., block 450B), a cyclic domain transfer (see, e.g., block 450C), annotation extraction and corresponding response action performance (e.g., block 450D), and so forth.

In an embodiment, block 450 can include blocks 450A-C.

At block 450A, train another supervised learning element in an object category detection or other type of detection/classification network using one or more of the additional synthetic images.

At block 450B, generate the additional synthesized images for different weather and/or other environmental conditions.

At block 450C, perform a cyclic domain transfer with respect to the first image domain and the second image domain using the additional synthesized images.

In an embodiment, block 450C can include block 450C1.

At block 450C1, enforce, by the cyclic GAN framework, cyclic consistency across the cyclic domain transfer while adapting the image properties from one of the domains to another one of the domains.

At block 450D, perform an annotation operation using the additional synthetic images, perform a matching operation between the resultant annotations and a predetermined set of action words, and initiate a response action when one or more matches occur.

A further description will now be given regarding various aspects of the present invention, in accordance with an embodiment of the present invention.

The present invention incorporates a principled deep generative model to learn high quality image generation models.

The present invention introduces a novel cyclic GAN framework that does not require supervised datasets, e.g., same image in the two domains.

At test time, new images can be efficiently generated using the already trained generative network.

In an embodiment, the generated images could be used for training other supervised learning modules such as semantic segmentation or object category detection networks. Particularly, using the image generation network trained for domain transfer from synthetic to real, a dataset with detailed annotations can be obtained almost for free. The annotations can be obtained and/or otherwise derived from the semantic content, as preserved by the L2 loss. In an embodiment, a processor (e.g., CPU 104) can be used to receive the annotations and perform matching against the annotations such that matches between the annotations and a predetermined set of actions can be used to initiate a response action. For example, in the case of classifying an action as dangerous (e.g., due to the presence of a weapon (e.g., a firearm or knife), an action can be initiated by the processor such as locking a door to keep the person holding the weapon out of an area or contained within an area.

In an embodiment, the present invention can be applied to train an image generation network for different weather conditions. It is to be appreciated that having a large dataset for all possible weather condition can be prohibitively costly. However, using the present invention, datasets can be generated for different weather conditions without additional labors.

These and other applications to which the present invention can be applied are readily determined by one of ordinary skill in the art, given the teachings of the present invention provided herein, while maintaining the spirit of the present invention.

Some of the many advantages and/or contributions made by the present invention include, but are not limited to, the following.

The present invention does not require a supervised dataset to train the model, noting that a supervised dataset is often not available in many important application domains.

Moreover, the present invention can generate higher quality images that conventional approaches.

Additionally, the present invention can be used to generate image data for other supervised learning methods, such as object detection, semantic segmentation, and so forth. This can significantly reduce the cost for data acquisition.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for unsupervised cross-domain image generation relative to a first image domain and a second image domain that each include real images, comprising:
   a first image generator for generating synthetic images having a similar appearance to one or more of the real images in the second image domain while including a semantic content of one or more of the real images in the first image domain;
   a second image generator for generating synthetic images having a similar appearance to at least one of the real images in the first image domain while including a semantic content of at least one of the real images in the second image domain;
   a first discriminator for discriminating the real images in the first image domain against the synthetic images generated by the second image generator; and
   a second discriminator for discriminating the real images in the second image domain against the synthetic images generated by the first image generator;
   wherein the discriminators and the generators are deep neural networks and respectively form a generative network and a discriminative network in a cyclic Generative Adversarial Network (GAN) framework that is configured to increase an error rate of the discriminative network to improve a quality of the synthetic images.

2. The system of claim 1, wherein the cyclic GAN framework employs a cyclic consistency loss in order to preserve the semantic contents for inclusion in the generated synthetic images.

3. The system of claim 1, wherein the first image domain and the second image domain include at least some different real images relative to each other.

4. The system of claim 1, wherein the generators are implemented by respective convolutional neural networks, and the discriminators are implemented by respective de-convolutional neural networks.

5. The system of claim 1, wherein the generators generate the synthetic images using gradients provided by the discriminators.

6. The system of claim 1, wherein the generative network is configured to train another supervised learning element in an object category detection network.

7. The system of claim 1, wherein the cyclic GAN framework is configured to perform a cyclic domain transfer with respect to the first image domain and the second image domain.

8. The system of claim 7, wherein the cyclic GAN framework is configured to enforce cyclic consistency across the cyclic domain transfer while adapting the image properties from one of the domains to another one of the domains.

9. The system of claim 1, wherein the generative network of the cyclic GAN framework is configured to generate the synthetic images for different weather conditions from the real images in any of the first domain and the second domain.

10. The system of claim 1, wherein the cyclic GAN framework forms an unsupervised domain-to-domain translation model configured for unsupervised learning from a training dataset from among the domains.

11. A computer-implemented method for unsupervised cross-domain image generation relative to a first image domain and a second image domain that each include real images, comprising:
   generating, by a first image generator, synthetic images having a similar appearance to one or more of the real images in the second image domain while including a semantic content of one or more of the real images in the first image domain;
   generating, by a second image generator, synthetic images having a similar appearance to at least one of the real images in the first image domain while including a semantic content of at least one of the real images in the second image domain;
   discriminating, by a first discriminator, the real images in the first image domain against the synthetic images generated by the second image generator; and
   discriminating, by a second discriminator, the real images in the second image domain against the synthetic images generated by the first image generator,
   wherein the discriminators and the generators are each neural network based and respectively form a generative network and a discriminative network in a cyclic Generative Adversarial Network (GAN) framework, and the method further comprises increasing an error rate of the discriminative network to improve a quality of the synthetic images.

12. The computer-implemented method of claim 11, further comprising utilizing a cyclic consistency loss in the cyclic GAN framework in order to preserve the semantic contents for inclusion in the generated synthetic images.

13. The computer-implemented method of claim 11, wherein the first image domain and the second image domain include at least some different real images relative to each other.

14. The computer-implemented method of claim 11, further comprising:
   configuring each of a pair of convolutional neural networks as a respective one of the generators; and
   configuring each of a pair of de-convolutional neural networks as a respective one of the discriminators.

15. The computer-implemented method of claim 11, wherein said generating steps generate the synthetic images using gradients provided by the discriminators.

16. The computer-implemented method of claim 11, further comprising training, by the generative network, another supervised learning element in an object category detection network.

17. The computer-implemented method of claim 11, further comprising performing, by the cyclic GAN framework, a cyclic domain transfer with respect to the first image domain and the second image domain.

18. The computer-implemented method of claim 17, further comprising configuring the cyclic GAN framework to enforce cyclic consistency across the cyclic domain transfer while adapting the image properties from one of the domains to another one of the domains.

19. The computer-implemented method of claim 11, further comprising configuring the generative network of the cyclic GAN framework to generate the synthetic images for different weather conditions from the real images in any of the first domain and the second domain.

20. A computer program product for unsupervised cross-domain image generation relative to a first image domain and a second image domain that each include real images, the computer program product comprising a non-transitory computer readable storage medium having program instructions embodied therewith, the program instructions executable by a computer to cause the computer to perform a method comprising:
- generating, by a first image generator of the computer, synthetic images having a similar appearance to one or more of the real images in the second image domain while including a semantic content of one or more of the real images in the first image domain;
- generating, by a second image generator of the computer, synthetic images having a similar appearance to at least one of the real images in the first image domain while including a semantic content of at least one of the real images in the second image domain;
- discriminating, by a first discriminator of the computer, the real images in the first image domain against the synthetic images generated by the second image generator; and
- discriminating, by a second discriminator of the computer, the real images in the second image domain against the synthetic images generated by the first image generator,
- wherein the discriminators and the generators are each neural network based and respectively form a generative network and a discriminative network in a cyclic Generative Adversarial Network (GAN) framework, and the method further comprises increasing an error rate of the discriminative network to improve a quality of the synthetic images.

* * * * *